United States Patent
Rao et al.

Patent Number: 5,431,864
Date of Patent: Jul. 11, 1995

[54] METHOD OF MAKING COMPOSITE POROUS CARBONACEOUS MEMBRANES

[75] Inventors: Madhukar B. Rao, Allentown; Shivaji Sircar, Wescosville; Timothy C. Golden, Allentown, all of Pa.

[73] Assignee: Air Products and Chemicals, Inc., Allentown, Pa.

[21] Appl. No.: 229,081

[22] Filed: Apr. 18, 1994

Related U.S. Application Data

[63] Continuation of Ser. No. 903,430, Jun. 24, 1992, abandoned, which is a continuation-in-part of Ser. No. 436,566, Nov. 14, 1989, abandoned.

[51] Int. Cl.$^6$ .................. B29L 31/14; C01B 31/08
[52] U.S. Cl. .................. 264/29.5; 55/DIG. 5; 96/11; 96/154; 210/500.27; 264/29.6; 264/29.7; 264/DIG. 48
[58] Field of Search ............ 264/29.1, 29.5, 29.6, 264/29.7, DIG. 48; 55/DIG. 5; 428/408; 210/500.27; 96/11, 154; 95/47, 50, 51, 116, 130, 139, 140, 143, 144

[56] References Cited

U.S. PATENT DOCUMENTS

| | | | |
|---|---|---|---|
| 4,371,454 | 2/1983 | Hisatsugu et al. | 264/29.6 |
| 4,583,996 | 4/1986 | Sakata et al. | |
| 4,640,901 | 2/1987 | Lee et al. | |
| 4,699,892 | 10/1987 | Suzuki | |
| 4,740,219 | 4/1988 | Kulprathipanja et al. | |
| 4,775,655 | 10/1988 | Edwards et al. | 264/29.6 |
| 4,828,588 | 5/1989 | Hwang et al. | |
| 4,853,001 | 8/1989 | Hammel | |
| 4,865,630 | 9/1989 | Abe | |
| 4,880,765 | 11/1989 | Knoblauch et al. | 264/29.5 |
| 4,888,033 | 12/1989 | Charpin et al. | |
| 4,909,989 | 3/1990 | Fukazawa et al. | |
| 4,925,459 | 5/1990 | Rojey et al. | |
| 4,971,696 | 11/1990 | Abe et al. | |
| 4,999,330 | 3/1991 | Bose et al. | 264/29.5 |
| 5,104,425 | 4/1992 | Rao et al. | 55/16 |

FOREIGN PATENT DOCUMENTS 3-161030 7/1991 Japan.

Primary Examiner—Mathieu D. Vargot
Attorney, Agent, or Firm—John M. Fernbacher

[57] ABSTRACT

Improved composite semipermeable membranes including microporous carbonaceous adsorptive material supported by a porous substrate for use in separating multi-component gas mixtures in which certain components in the mixture adsorb within the pores of the adsorptive material and diffuse by surface flow through the membrane to yield a permeate stream enriched in these components. Methods for making the improved composite membranes are described including one or more oxidation steps which increase the membrane permeability and selectivity.

22 Claims, 2 Drawing Sheets

METHOD OF MAKING COMPOSITE POROUS CARBONACEOUS MEMBRANES

This is a continuation of application Ser. No. 07/903,430 filed on Jun. 24, 1992, now abandoned, which is a continuation-in-part of application Ser. No. 07/436,566 filed Nov. 14, 1989, now abandoned.

FIELD OF THE INVENTION

This invention pertains to the field of gas separation by porous membranes, and in particular to adsorptive composite porous carbonaceous membranes.

BACKGROUND OF THE INVENTION

Fluid mixtures can be separated by selective diffusion through membranes under concentration or pressure gradients by utilizing differences in transport and thermodynamic partition or equilibrium properties of the mixture components in the membrane materials. One widely-used type of membrane comprises a non-porous polymer in which the mixture components selectively dissolve and selectively permeate or diffuse in the soluble state through the polymer to yield a permeate product enriched in the selectively diffusing components and a non-permeate or reject product enriched in the remaining components. A second type of membrane comprises a porous solid in which the mixture components selectively diffuse or permeate in the fluid state through the pores to yield a permeate product enriched in the selectively diffusing components and a non-permeate or reject product enriched in the remaining components.

There are four mechanisms by which fluid mixtures, in particular gas mixtures, can be separated by a solid porous membrane. The first of these is diffusion in the gas phase through pores having diameters approaching the mean free path dimensions of the molecules in the gas mixture, which is often termed Knudsen flow or Knudsen diffusion. These pores are small enough, however, to preclude bulk gas flow by molecular diffusion. In Knudsen flow, the permeation rate of each component is inversely proportional to the square root of its molecular weight. The phenomenon of gas diffusion and separation by Knudsen flow through porous solids is well known, and is described in standard textbooks such as "Mass Transfer in Heterogeneous Catalysis", by C. N. Satterfield, MIT Press, 1969.

A second type of mechanism for the separation of gas mixtures by porous solids occurs when the diameters of the pores are larger than the largest molecular diameter of the components in the gas mixture and range up to about 40–100 Angstroms in diameter. At the appropriate temperature and pressure conditions, certain components in the gas mixture will condense within the pores by capillary or Kelvin condensation and flow through the pores as a condensed phase under a capillary pressure gradient across the membrane. Condensed molecules within the pores hinder or eliminate the diffusion of non-condensing molecules, and a selective separation between components in the gas mixture is thus accomplished.

A third type of separation mechanism occurs when the pore diameters of the membrane are larger than the largest molecular diameter of the components in the gas mixture and typically smaller than about 2 to 5 times this diameter, and thus are smaller than pores in which Knudsen diffusion dominates. These pores have typical diameters of about 3 to 20 Angstroms and are termed micropores by the classification definition of the International Union of Pure and Applied Chemistry (I.U.P.A.C.). In the present disclosure, the term "pores" will be used to denote pores of any size, including micropores. When a gas mixture is contacted with such a porous membrane, the separation mechanism defined as selective surface flow or selective surface diffusion can occur under a pressure gradient across the membrane. This mechanism is characterized by the selective adsorption of certain mixture component molecules within the pores and the surface flow of these molecules in the adsorbed phase through the pores. Furthermore, the adsorbed phase hinders the gas-phase diffusion of non-adsorbed or weakly adsorbed component molecules through the pores, and an enhanced selective separation between components in the gas mixture is thus accomplished.

The fourth mechanism by which gas mixtures are separated by a solid porous membrane material is that of molecular sieving in which essentially all of the pores are larger than certain component molecules and smaller than other component molecules in the mixture. Larger molecules cannot enter these pores or are substantially excluded, while smaller molecules can enter and diffuse through the pores, and a selective separation based upon exclusion by molecular size is thus accomplished.

Since porous solids contain a distribution of pore sizes, more than one of these mechanisms can occur simultaneously depending upon the actual pore size distribution and sizes of component molecules in the gas mixture, as well as the pressure and temperature. However, a single mechanism usually dominates and the resulting mixture separation is essentially accomplished by means of that dominant mechanism.

U.S. Pat. No. 5,104,425 discloses a composite semipermeable membrane comprising porous adsorptive material supported by a porous substrate, a series of methods for making the membrane, and a process for the separation of multicomponent fluid mixtures utilizing the third of the four mechanisms described above. The separation is accomplished by bringing the fluid mixture into contact with a first surface of the membrane, wherein significant portions of certain components are selectively adsorbed within the pores in the adsorptive material and permeate through the pores by surface flow in an adsorbed phase to produce a permeate product enriched in these components. The remaining fluid mixture is withdrawn from contact with the membrane to yield a nonpermeate fluid product enriched in the remaining components.

The membrane is made by coating a surface of a porous substrate with a layer of a precursor material, heating the resulting coated porous substrate in an inert atmosphere to a temperature sufficient to convert the precursor material into a layer of microporous adsorptive material, and cooling the resulting composite membrane to ambient temperature. Precursor materials can include polymeric materials which are carbonized by heating in an inert atmosphere to form a layer of microporous carbon on the surface of the substrate or Inorganic materials which are dried and crystallized to form a layer of porous inorganic adsorbent material on the surface of the substrate. The microporous adsorptive material forms a layer up to about 20 microns thick.

A method is also disclosed for making a densified composite semipermeable membrane by introducing a precursor into the pores of a porous substrate, heating the porous substrate containing the precursor under conditions sufficient to convert the precursor to porous adsorptive material within the pores, and cooling the resulting composite membrane to ambient temperature. The porous adsorptive material can be activated carbon formed by the carbonization of polymeric materials or by the deposition of carbon by vapor phase cracking of gaseous hydrocarbons followed by activation in an oxidizing atmosphere.

The preferred method of making these membranes utilizes a polymeric precursor to produce carbon as the porous adsorptive material which separates the gas mixtures of interest. These membranes are useful for recovering hydrogen from mixtures with light hydrocarbons such as methane, ethane, propane, and butane to yield a permeate enriched in the hydrocarbons and a hydrogen-rich product essentially at the feed pressure.

In industrially important gas separations such as the recovery of hydrogen, improved separation efficiency and process economy are desirable when utilizing adsorptive membranes. Such improvements can be achieved by increasing the permeability and selectivity of these membranes for hydrocarbons by methods of the present invention as described in the following specification and claims.

SUMMARY OF THE INVENTION

The invention is a composite semipermeable membrane for the separation of a multicomponent fluid mixture containing one or more primary components and one or more secondary components and a method for making the membrane which comprises coating a surface of an inert porous substrate with a layer of an organic precursor material, heating the resulting coated porous substrate in an inert atmosphere to a first temperature, maintaining this temperature for a time sufficient to convert the precursor material into a layer of microporous carbonaceous adsorptive material, and cooling the resulting composite membrane to a temperature below the first temperature. The permeability and selectivity of the membrane are improved by heating the cooled membrane to a second temperature, oxidizing the heated membrane at this temperature in an oxidizing atmosphere selected from the group consisting of air, oxygen, carbon oxides, nitrogen oxides, steam, and mixtures thereof, and cooling the resulting oxidized membrane to ambient temperature. The microporous carbonaceous adsorptive material so produced can selectively adsorb portions of the primary components which diffuse through the membrane by selective surface flow.

In an alternate embodiment, the invention is a densified composite semipermeable membrane for the separation of a multicomponent fluid mixture containing one or more primary components and one or more secondary components and a method for making the membrane which comprises introducing an organic precursor into the pores of an inert porous substrate, heating the porous substrate containing the organic precursor to a first temperature, maintaining the membrane at this temperature under conditions sufficient to convert the precursor to microporous carbonaceous adsorptive material within the pores, and cooling the resulting densified membrane to a temperature below the first temperature. The permeability and selectivity of the membrane are improved by heating the cooled membrane to a second temperature in an oxidizing atmosphere selected from the group consisting of air, oxygen, carbon oxides, nitrogen oxides, steam, and mixtures thereof, and cooling the resulting oxidized membrane to ambient temperature. The microporous carbonaceous adsorptive material so produced can selectively adsorb portions of the primary components which diffuse through the membrane by selective surface flow.

DETAILED DESCRIPTION OF THE INVENTION

Figure 1:
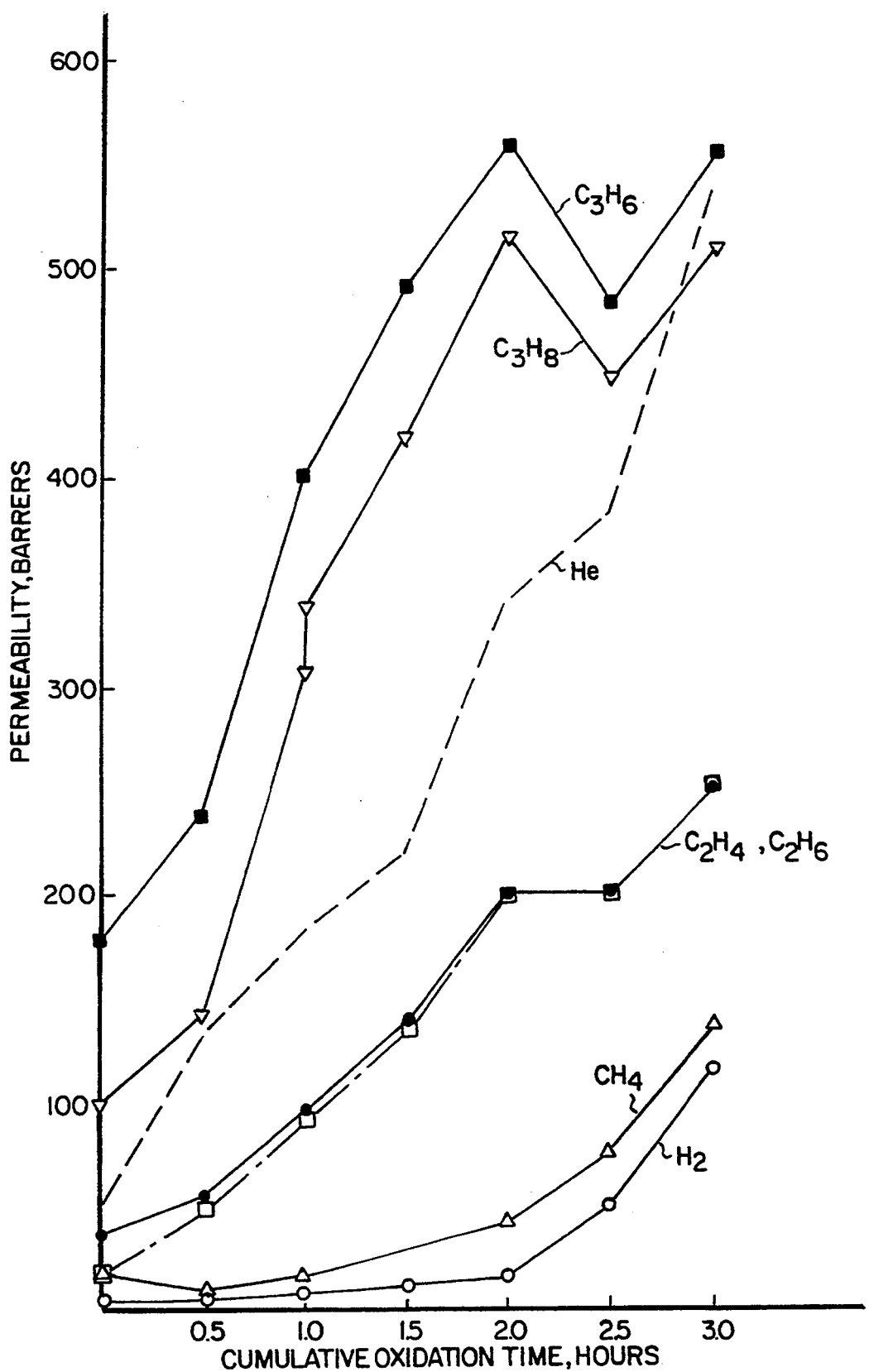
FIG. 1 is a plot of permeability vs. oxidation time for various gas components through the membrane of the present invention.

The improved adsorptive carbonaceous composite porous membranes of the present invention allow the practical application of the mechanism of surface flow of adsorbed components to the separation of fluid mixtures, particularly gas mixtures. Adsorbed surface flow also is described herein by the term selective surface flow. In order to effect gas separations by utilizing selective surface flow, the pore size distribution of the porous material is critical. In the porous semipermeable membrane of the present invention, the microporous adsorptive material selectively adsorbs a significant portion of at least one of the primary components in the gas mixture, the adsorbed components diffuse by surface flow in an adsorbed phase through the pores due to adsorbed phase concentration gradients created by pressure gradients across the membrane, and the diffusion product is thus enriched in at least one of the primary components. The presence of adsorbed primary components in the pores hinders the diffusion of less-strongly adsorbed or non-adsorbed secondary components, so that the non-diffusion or reject product is enriched in the secondary components. The predominant mechanism of this separation is that of selective adsorbed phase surface flow.

The substrate used for the membrane should have a distribution of pore diameters between about 0.2 and 50 microns and is selected from the group consisting of ceramic, carbonaceous, metallic, and polymeric materials and combinations thereof. The substrate has essentially no effect on the separation of mixtures by the microporous carbonaceous adsorptive material supported by the substrate, and the substrate therefore is defined as inert.

Gas mixtures of particular interest for separation by the improved adsorptive carbonaceous composite porous membranes of the present invention, as described more fully below, typically comprise but are not limited to the components given in Table 1 which also lists the molecular diameters of the components. For the purposes of the present disclosure, the molecular diameter is defined as the kinetic diameter, $\sigma$, as described in the text "Zeolite Molecular Sieves" by D. N. Breck, Kruger Publishing Co., 1984, pp 633–645, and in particular Table 8.14 at p. 636.

TABLE I

| Component | Molecular Diameter, $\sigma$ Angstroms |
|---|---|
| Helium | 2.6 |
| Hydrogen | 2.89 |
| Carbon Dioxide | 3.3 |

TABLE I-continued

| Component | Molecular Diameter, σ Angstroms |
| --- | --- |
| Oxygen | 3.46 |
| Nitrogen | 3.64 |
| Carbon Monoxide | 3.76 |
| Methane | 3.8 |
| Ethylene | 3.9 |
| Propane | 4.3 |
| n-Butane | 4.3 |

The improved adsorptive carbonaceous composite porous membranes of the present invention are based upon the composite semipermeable membranes of U.S. Pat. No. 5,104,425, the specification of which is incorporated herein by reference. In contrast with earlier porous materials for effecting gas separation by selective surface flow of adsorbed components, the membranes of U.S. Pat. No. 5,104,425 and the improved membranes of the present invention are thin, composite membranes suitable for use in commercial membrane modules. The diffusion of gaseous components through a membrane is proportional to the fundamental permeability of the components through the membrane, the membrane area, and the pressure or concentration gradient across the membrane, and is inversely proportional to the thickness of the active layer of membrane material. This is well known in the membrane gas separation field, and leads to the fact that in order to achieve commercial membrane modules of practical size and membrane surface area, the active membrane thickness must be very small, for example generally less than about one micron when polymeric membranes are used. For the porous semipermeable membranes of the present invention, the thickness of the active membrane layer likewise must be minimized; the thickness of the active layer of porous material in the asymmetric or composite membranes of the present invention is less than about 20 microns. Earlier porous semipermeable membranes or plugs of porous material for gas separation by surface flow comprise homogeneous porous material many orders of magnitude thicker than that of the present invention. Such membranes or plugs are made typically of compacted particles of materials such as graphitized carbon black and are about 9 mm thick.

It has been found that improved adsorptive carbonaceous composite porous membranes can be made by subjecting the composite semipermeable membranes of U.S. Pat. No. 5,104,425 to one or more oxidation steps as described below. The oxidation steps increase both the permeability and selectivity of the composite membranes, particularly for the separation of hydrogen-light hydrocarbon mixtures. The improved composite membranes can be made in two different configurations: (1) a composite membrane in which the porous adsorptive material forms a very thin layer on a surface of the porous substrate; or (2) a densified composite membrane in which the porous adsorptive material is contained within the pores of the substrate. In certain cases, membranes may include the physical characteristics of both (1) and (2) wherein active adsorptive material is deposited on the surface as well as within the pores of the membrane.

The adsorptive material and the substrate in the composite membrane can be the same material or different materials. A composite membrane having the same material in both the active layer and the substrate layer is also defined as an asymmetric membrane. The term composite membrane as used in the present disclosure thus refers to a membrane made up of different parts which have different properties, in contrast to a homogeneous membrane having the same properties throughout.

The composite membrane of U.S. Pat. No. 5,104,425 can be made by several different methods. In the preferred embodiment, the surface of a porous substrate is coated with an organic precursor material which upon appropriate heating is converted into a layer of porous adsorptive material which promotes the separation of the gas mixture of interest. The porous substrate can be a ceramic, carbonaceous, metallic, or polymeric material, or combinations thereof, which has a distribution of pore diameters between about 0.2 and 50 microns and which has essentially no effect upon the diffusion and separation of the gas mixture of interest. The substrate can be in the form of a flat sheet or a hollow fiber or tube. The typical thickness of a flat sheet substrate is 10 to 500 microns and the wall thickness of a hollow fiber or tube substrate is 3 to 500 microns.

In a first method of making the composite membrane, the substrate is coated with a layer of a latex or solution containing polyvinylidene chloride, polyvinyl chloride, polyacrylonitrile, styrene-divinyl benzene copolymer, or mixtures thereof, or other polymers. The latex or solution can contain a single polymer or a mixture of polymers, and may contain small amounts of other compounds to control certain physical properties of the latex or solution. The latex or solution is applied to the surface of the substrate by a suitable method such as brushing, spraying, or immersion, and the amount of latex or solution applied is controlled so that a desired thickness of the final layer of porous adsorptive is obtained. A suitable substrate for this membrane is porous graphite having an average pore diameter between about 0.2 and 50 microns and a typical thickness of 250 microns.

The latex-coated substrate is then heated in an inert atmosphere such as nitrogen at a heating rate of up to 1.0° C./min to a maximum temperature of between 600° and 1200° C., followed by cooling to a lower temperature, preferably ambient temperature. The cooling rate is critical, and generally should be less than 10° C./min. The heating pyrolyzes or carbonizes the polymer to yield a thin layer of porous carbon on the surface of the substrate to form an asymmetric or composite membrane. The porous material formed in this manner can selectively adsorb and separate components of the gas mixtures of interest previously described. Performance optionally can be improved by repeating the latex coating and carbonization steps one or more times, up to typically four or five times.

The adsorptive membrane prepared by this procedure is then subjected to an additional treatment or plurality of treatments according to the present invention in which the membrane is heated to a temperature between about 200° and 950° C., oxidized at that temperature in an oxidizing atmosphere for a period of between about 0.25 and 12 hours, preferably between about 0.5 and 10 hours, and then cooled to a lower temperature, preferably ambient temperature. The oxidizing atmosphere is selected from air, oxygen, steam, carbon oxides, nitrogen oxides, and mixtures thereof. It has been found that when using air as the oxidizing gas, repeated oxidizing steps of relatively short duration and moderately high temperature, for example 0.5 hours at 400° C. followed by cooling to a lower temperature (preferably ambient temperature), are preferred. Increased gas permeability through the membrane is observed for up to four to six cycles depending on the component in the gas mixture of interest. A cycle is defined herein to include the steps of (1) heating, preferably in an inert atmosphere, from the initial temperature to the desired temperature of oxidation, (2) holding at this temperature in an oxidizing atmosphere for the desired time period, and (3) cooling, preferably in an inert atmosphere, to a lower temperature. This lower temperature is preferably ambient temperature, but any temperature lower than the oxidation temperature may be used, and the temperatures between multiple oxidation steps need not be equal temperatures. Alternately, the heating and/or cooling steps may be carried out in a reactive atmosphere rather than an inert atmosphere. The optimum duration of the oxidation period and number of cycles will depend upon the temperature and the specific oxidizing atmosphere used, and various combinations are possible to improve the separation of various gas mixtures.

Significantly, it has been found that in mixtures of hydrogen and light hydrocarbons the permeabilities of propane and propylene through this membrane increase markedly as the membrane is treated by up to four cycles of oxidation in air at 400° C. in which each cycle Includes 0.5 hr oxidation time. The permeabilities of ethane and ethylene increase but less rapidly than propane and propylene, and the permeabilities of methane and hydrogen increase but much less rapidly than ethane and ethylene. Further, above about four such cycles the permeabilities of methane and hydrogen continue to increase much more rapidly than those of ethane, ethylene, propane, and propylene. Thus the repeated oxidation cycles result in dramatic increases in permeability for all components in such a mixture, which is desirable to reduce the required membrane area to accomplish the separation of hydrocarbons from hydrogen.

In separating gas mixtures such as hydrogen-light hydrocarbon mixtures using these membranes, the hydrocarbon-hydrogen selectivities also are important parameters which describe membrane performance. Selectivity is defined as the ratio of a given hydrocarbon permeability to that of hydrogen at a given set of conditions. It has been found that the selectivities for these components increase as the number of oxidation cycles increases (in which each cycle includes 0.5 hr oxidation time), reach maxima, and then decrease markedly above about four such cycles. Increased selectivities are desirable to increase the purity and recovery of hydrogen product.

The most significant and unexpected finding of the present invention is that both the permeability and the selectivity for each component in a mixture can be increased by the oxidation treatment described above, and the proper selection of the number and duration of oxidation steps, temperature, and oxidizing gas yields the optimum combination of increased permeability and selectivity for the membrane. This differs markedly from experience in the polymeric membrane art, in which membrane modifications to increase permeability generally reduce selectivity and conversely modifications to improve selectivity generally reduce permeability. This significant finding is illustrated in the following Examples.

EXAMPLE 1

A composite membrane was prepared by cutting a four-inch diameter disk from a sheet of porous graphite and drying the disk for about 30 minutes under dry nitrogen at 150° C. After drying the disk and cooling to room temperature, approximately 0.1 cc of a polymer dispersion (latex) was dispersed by syringe onto the disk and was spread over the surface of the disk using a brush. The coated disk was placed on a motor and spun at 3,000 rpm for one minute to remove excess latex. The coated disk was air dried at ambient temperature for about one to two hours, and was then placed in a drying oven under nitrogen at 150° C. for about five minutes. The coated disk was then heated under nitrogen to 1,000° C. at a heating rate of 1° C./minute, was held at 1,000° C. for three hours, and then was cooled to room temperature under nitrogen at 10° C./min. The entire procedure was repeated five times. The graphite substrate used is a commercially-available material designated as Type DFP-1 graphite sheet manufactured by POCO Graphite Co. The average pore diameter of this material is about 0.7 microns; the material has a porosity of 20% and a thickness of 250 microns. The polymer latex is a commercially available aqueous dispersion of 0.1–0.14 micron polymer beads containing 55 wt % solids; the polymer is a polyvinylidene chloride-acrylate terpolymer. This material is sold under the trade name DARAN by N. R. Grace and Co., and the specific type used in this example was DARAN 8600.

The resulting membrane (designated as Membrane A) was characterized by permeation tests at 21° C. and −11° C. in which a feed mixture containing 20 vol % hydrogen, 8.0 vol % ethylene, 8.3 vol % ethane, 20.2 vol % methane, 14.9 vol % ethane, and 28.6 vol % ethylene was passed over one surface of the membrane at 4.5 arm and the component permeation was measured into a helium sweep stream across the other surface at 1.07 atm. The membrane was then heated to 400° C. in nitrogen, oxidized in zero grade air for 0.5 hours, and cooled to ambient temperature in nitrogen. This defines one oxidation cycle. Component permeabilities were again measured by the same method. The oxidation cycle then was repeated five successive times and component permeabilities were determined between each cycle. The pure component permeabilities in helium were also measured between each cycle.

The measured permeabilities at 21° C. are plotted as a function of cumulative oxidation time in FIG. 1, where the cumulative oxidation time is defined as the oxidation time per cycle times the number of cycles, or the total time during which the membrane is held at the oxidizing temperature for all cycles. The results show that the permeabilities of propane and propylene increase dramatically with cumulative oxidation time, reaching values about three times the permeabilities for an unoxidized membrane. The permeabilities of ethane and ethylene increase with cumulative oxidation time, reaching values of about seven times the values for an unoxidized membrane. The permeabilities of methane and hydrogen rise slowly up to about two hours of oxidation, and then increase sharply at higher oxidation times. Helium permeability rises monotonically with cumulative oxidation time. FIG. 1 thus illustrates that repeated oxidation increases permeabilities for all components in the mixture, but to different degrees.

The measured permeabilities were then used to calculate selectivities for each component in the mixture, where selectivity is defined as the ratio between a given component permeability and the permeability of hydrogen. These selectivities are plotted in FIG. 2, which illustrates that selectivities for all components increase with cumulative oxidation time up to a range of about two hours, and then decrease at higher levels of oxidation to values equivalent to or less than the unoxidized membrane selectivities. For this membrane and gas mixture, maximum improvement in selectivities occurs in the range of one to two hours, which corresponds to two to four oxidation cycles.

Figure 2:
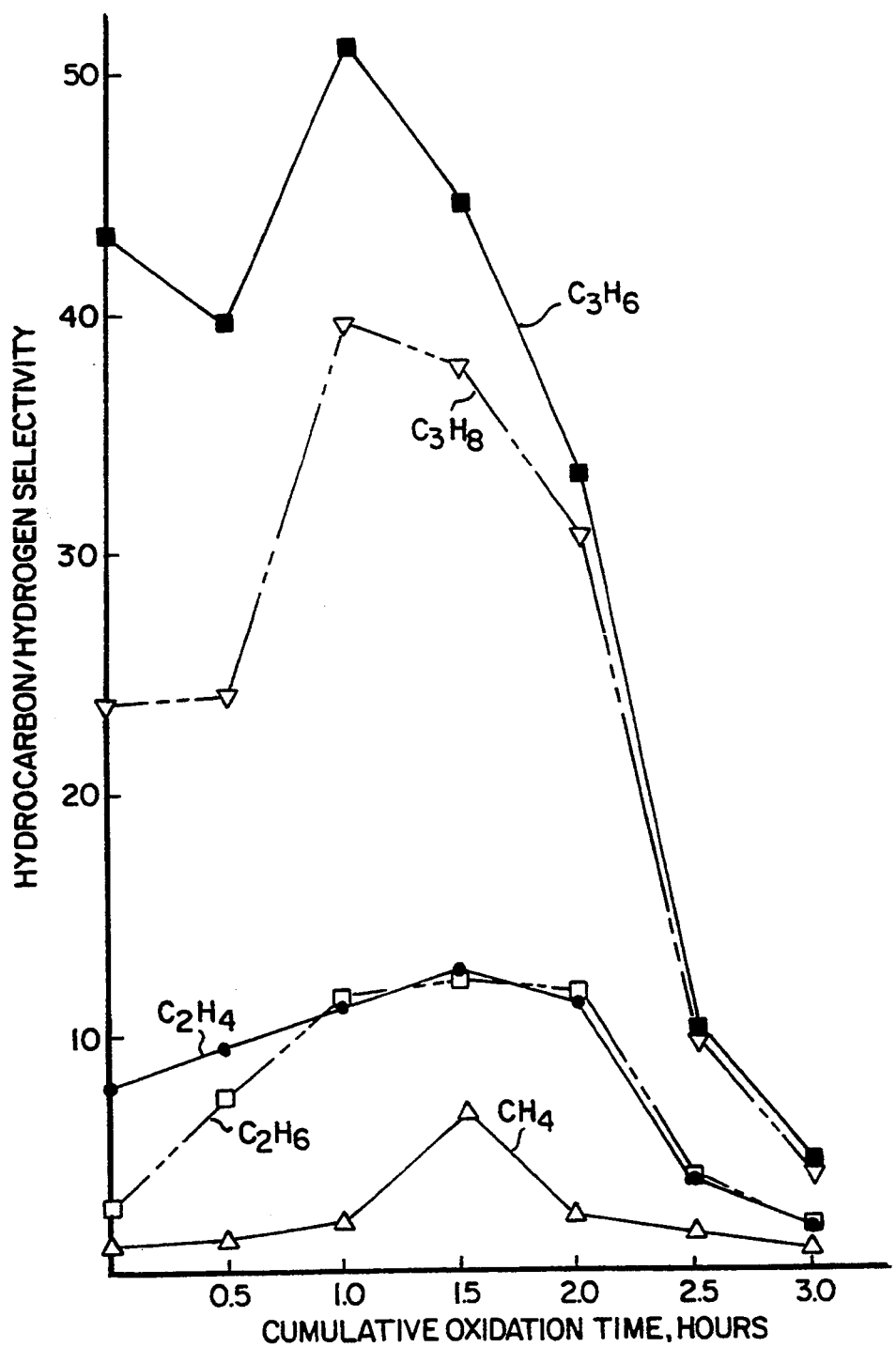
FIG. 2 is a plot of selectivity vs. oxidation time for various gas components through the membrane of the present invention.

FIGS. 1 and 2 illustrate the important and unexpected finding of the present invention, namely, that both permeability and selectivity of the adsorptive carbonaceous composite membrane are improved when the proper oxidation time and number of oxidation cycles are selected. This is an important finding, and is contrary to the known behavior of polymeric membranes wherein modifications which increase permeability decrease selectivity, and modifications which improve selectivity decrease permeability.

result. Based on these results, the preferred method of oxidation is a series of oxidation steps with cooling between steps rather than a single continuous oxidation step for the same time period at the same temperature. This is confirmed by the permeability and selectivity results at −11° C. summarized in Table 3, in which Membrane A exhibits a smaller increase in permeability but a significant increase in selectivity for all components but methane, while Membrane B exhibits slight increases in selectivities for two components but decreases for the other components.

TABLE 2

EFFECT OF OXIDATION TIME ON MEMBRANE PROPERTIES AT 21° C.

| | Membrane A 1.5 Hrs. Oxidation in 0.5 Hr. Cycles | | | | Membrane B 1.5 Hrs. Continuous Oxidation | | | |
|---|---|---|---|---|---|---|---|---|
| | Unoxidized | | Following Oxidation | | Unoxidized | | Following Oxidation | |
| Mixture Component | P. Barrers | Selectivity | P. Barrers | Selectivity | P. Barrers | Selectivity | P. Barrers | Selectivity |
| $H_2$ | 4 | 1 | 11 | 1 | 3 | 1 | 82 | 1 |
| $C_2H_4$ | 32 | 7.8 | 141 | 12.7 | 30 | 9.4 | 332 | 4 |
| $C_2H_6$ | 12 | 2.9 | 135 | 12.2 | 23 | 7.2 | 366 | 4.4 |
| $CH_4$ | 14 | 3.5 | 72 | 6.5 | 7 | 2.2 | 153 | 1.9 |
| $C_3H_8$ | 97 | 23.7 | 417 | 37.7 | 106 | 33.5 | 620 | 7.5 |
| $C_3H_6$ | 178 | 43.3 | 489 | 44.3 | 125 | 39.4 | 609 | 7.4 |
| Pure He | 47 | | 215 | | 56 | | 683 | |

TABLE 3

EFFECT OF OXIDATION TIME ON MEMBRANE PROPERTIES AT −11° C.

| | Membrane A 1.5 Hrs. Oxidation in 0.5 Hr. Cycles | | | | Membrane B 1.5 Hrs. Continuous Oxidation | | | |
|---|---|---|---|---|---|---|---|---|
| | Unoxidized | | Following Oxidation | | Unoxidized | | Following Oxidation | |
| Mixture Component | P. Barrers | Selectivity | P. Barrers | Selectivity | P. Barrers | Selectivity | P. Barrers | Selectivity |
| $H_2$ | 3 | 1 | 5 | 1 | 2 | 1 | 21 | 1 |
| $C_2H_4$ | 16 | 4.8 | 66 | 13.5 | 20 | 10.6 | 197 | 9.6 |
| $C_2H_6$ | 14 | 4.4 | 61 | 12.5 | 14 | 7.2 | 219 | 10.6 |
| $CH_4$ | 8 | 2.5 | 11 | 2.3 | 3 | 1.7 | 55.4 | 2.7 |
| $C_3H_8$ | 54 | 16.6 | 274 | 56.2 | 99 | 51.2 | 502.7 | 24.4 |
| $C_3H_6$ | 125 | 38.2 | 367 | 74.7 | 120 | 61.7 | 500.1 | 24.3 |
| Pure He | 18 | | 92 | | 33 | | 512 | |

EXAMPLE 2

A second membrane (designated as Membrane B) was prepared and carbonized as in Example 1 and component permeabilities were measured in the same manner. This membrane was then oxidized continuously for 1.5 hours at the same oxidation conditions of Example 1, and mixture component permeabilities were measured again in the same manner. These results are compared in Tables 2 and 3 with results for Membrane A of Example 1 after three oxidation cycles of 0.5 hr oxidizing time each for a total oxidation time of 1.5 hours. It is seen that continuous oxidation of Membrane B for 1.5 hours yields significant increases in permeabilities and significant decreases in selectivities at 21° C. compared with the values for the unoxidized membrane. However, Membrane A, which was oxidized in three cycles wherein each cycle includes 0.5 hr oxidation time, exhibits increases in both permeability and selectivity for all mixture components, which is a highly desirable

EXAMPLE 3

A carbon membrane (Membrane C) was prepared and carbonized by the same procedures of Example 1, except that after the fifth carbonization step the membrane was cooled to 400° C. and oxidized for 1.5 hours in zero grade air followed by cooling in nitrogen to ambient temperature. The same permeation tests of Examples 1 and 2 were performed, except that permeance (P/1) was determined rather than permeability (P) since the carbon layer thickness of Membrane C could not be measured before oxidation. These results are compared with the data of Example 1 for Membrane A (expressed as permeance) in Table 4, and indicate that permeance and selectivity are significantly higher for the $C_3$ hydrocarbons with Membrane A than Membrane C. For the other mixture components, Membrane A is equivalent to or slightly better than Membrane C. These results confirm that the multiple cycle oxidation method of Example 1 is preferred to either of the single cycle oxidation methods of Examples 2 and 3. Note that at 21° C. Membrane C has significantly better selectivity for all mixture components than Membrane B (see Table 2), and at −11° C. Membrane C is significantly better than Membrane B for the $C_3$ hydrocarbons.

TABLE 4

EFFECT OF OXIDATION METHOD ON MEMBRANE PROPERTIES

| Mixture Component | 21° C. Membrane A Oxidized for 1.5 hours in 0.5 hour cycles | | 21° C. Membrane C Oxidized for 1.5 hours during fifth carbonization cycle | | −11° C. Membrane A Oxidized for 1.5 hours in 0.5 hour cycles | | −11° C. Membrane C Oxidized for 1.5 hours during fifth carbonization cycle | |
|---|---|---|---|---|---|---|---|---|
| | (P/l) | Selectivity | (P/l) | Selectivity | (P/l) | Selectivity | (P/l) | Selectivity |
| $H_2$ | 0.98 | 1 | 0.8 | 1 | 0.43 | 1 | 0.34 | 1 |
| $C_2H_4$ | 12.45 | 12.7 | 8.2 | 11.1 | 5.85 | 13.5 | 4.2 | 12.3 |
| $C_2H_6$ | 11.94 | 12.2 | 8.1 | 10.5 | 5.43 | 12.5 | 2.6 | 7.7 |
| $CH_4$ | 6.38 | 6.5 | 1.6 | 2.0 | 1.01 | 2.3 | 0.61 | 1.8 |
| $C_3H_8$ | 36.89 | 37.7 | 22.1 | 28.6 | 24.23 | 56.2 | 11.3 | 33.3 |
| $C_3H_6$ | 43.28 | 44.3 | 31.1 | 40.3 | 32.5 | 74.7 | 18 | 55.2 |
| Pure He | 19 | | 17 | | 8.18 | | 5 | |

(P/l) = $10^{-5}$ std cc/(cm$^2$-sec-cm Hg)

Composite membranes with microporous carbon as the active membrane layer also can be prepared by controlled carbonization of commercially available asymmetric polymeric membranes. For example, a commercially available asymmetric membrane comprising polyacrylonitrile and polyvinylidene chloride can be carbonized and converted to an asymmetric adsorptive membrane by heating at controlled temperatures under an inert atmosphere. The resulting carbon membrane can be activated by further heating in an oxidizing atmosphere containing nitrogen or carbon oxides, oxygen, air, steam, or mixtures thereof by the methods described above.

Composite semipermeable membranes of the present invention also can be prepared by forming microporous adsorptive material within the pores of a porous substrate. This type of an adsorptive membrane is defined herein as a densified composite membrane to distinguish it from the composite membrane earlier described. In one embodiment, porous carbon is formed within the pores of an appropriate substrate by introducing a polymer solution into the pores and heating the substrate to evaporate the solvent and deposit polymer within the pores. The polymer is then carbonized under conditions similar to those earlier discussed to yield a porous carbon structure. Further controlled heating in an oxidizing atmosphere by the methods described above can be utilized to impart improved porosity and adsorptive properties to the carbonized material. Polymers selected from polyvinylidene chloride, polyvinyl chloride, polyacrylonitrile, and styrene-divinylbenzene copolymers, or mixtures of these or other polymers, can be used for fabricating these densified composite membranes. Suitable solvents such as toluene, tetrahydrofuran, dimethyl formamide, dimethyl sulfoxide, acetone, and benzene and its derivatives can be used to dissolve the polymer(s) for introduction into the pores of the porous substrate.

The deposition of porous carbon within the pores of the porous substrate also can be accomplished in another embodiment of the present invention by vapor-phase thermal cracking of selected hydrocarbons within the pores to deposit carbon therein. These hydrocarbons can be selected from straight and branched chain alkanes and alkenes, aromatics and aromatic derivatives, or mixtures thereof. Thermal vapor phase cracking of these hydrocarbons generally takes place at temperatures between 300° and 900° C. The carbon deposited within the porous substrate by the method of this embodiment may have sufficient adsorptive properties to effect gas separation by the mechanism of selective surface flow. If such properties are not achieved by the initial deposition of carbon, the densified composite membrane can be further treated by heating in an oxidizing atmosphere as discussed above to impart improved microporosity, surface polarity, and adsorptive properties to the carbon within the substrate pores.

In a further embodiment of the present invention, densified composite membranes can be prepared by introducing a suspension of porous adsorptive carbonaceous particles into the pores of the porous substrate. The suspension can be an aqueous or organic suspension, and the particles can be introduced into the pores of the substrate by immersion or surface application of the suspension followed by capillary uptake into the pores. Alternatively, the suspension can be forced into the pores by means of a suitable pressure differential established by pressurization or vacuum. After the porous particles have been introduced into the pores of the substrate, the support is heated in an inert atmosphere to remove the solvent and deposit the particles with the pores of the substrate. Typical temperatures required to remove the suspension liquid from the support pores range from 50° to 250° C. The densified composite membrane thus produced can be treated further to modify the porosity or adsorptive properties of the adsorptive material by oxidation as described above. Any imperfections which may remain in the membrane and through which non-selective Knudsen or molecular diffusion could occur can be sealed by coating the support material with a thin layer less than about 1 micron thick of a high-permeability, low-selectivity polymeric material such as a silicon-containing polymer.

The active membrane thickness is a critical factor in the commercial application of these composite membranes as discussed earlier. The method of preparing the composite adsorptive membrane, in particular the amount of precursor applied to the porous substrate, should be carefully controlled to yield a final composite membrane having a layer of porous adsorptive material which is less than 20 microns thick. For the densified composite membrane, the actual thickness of the active adsorptive porous material within the pores of the substrate cannot be determined physically. However, the amount of precursor or adsorptive material introduced into the pores of the substrate should be controlled carefully to yield a membrane with permeabilities similar to those of the composite membrane. The densified composite membrane has a total thickness about the same as that of the initial substrate, and this thickness is generally less than 3 mm.

The membranes of the present invention can be utilized to separate a wide variety of gas mixtures in addition to the hydrogen-containing mixtures described in the Examples. Any gas mixture which contains primary and secondary components that are adsorbed to differing degrees by the microporous adsorptive material can be separated. The process is useful for, but not limited to, the separation of a range of gas mixtures including the following: one or more paraffinic, olefinic, or aromatic hydrocarbons as primary components and hydrogen as a secondary component; carbon dioxide and hydrogen; carbon monoxide and hydrogen; carbon monoxide and methane; carbon dioxide and methane; and nitrogen and oxygen.

An important and distinguishing feature of the improved adsorptive carbonaceous composite porous membrane of the present invention is that the higher molecular weight components of a mixture, for example carbon dioxide and light hydrocarbons, diffuse much more readily through the membrane than lower molecular weight components such as hydrogen. This differs from the separation of such mixtures by polymeric membranes, in which the reverse behavior generally occurs, that is, lower molecular weight components such as hydrogen selectively diffuse through the membrane while higher molecular weight components such as light hydrocarbons are selectively rejected. Similar behavior occurs when such mixtures are separated by porous membranes which utilize the principle of size exclusion or molecular sieving as earlier discussed. This feature of the membranes of the present invention allows the purification of important low molecular weight gases such as hydrogen at potentially lower cost when compared with the use of polymeric membranes, which recover the low molecular weight gas product as a permeate stream at low pressure. The membranes of the present invention recover the low molecular weight product as a non-permeate or reject stream at a high pressure, and thus the large pressure drop across the membrane which occurs with polymeric membranes is avoided. Another advantage of porous composite adsorptive membranes for the purification of valuable low molecular weight products such as hydrogen is realized when the impure feed gas contains relatively low concentrations of higher molecular weight contaminants. When a polymeric membrane system is used, the low molecular weight product permeates through the membrane, and the membrane surface area is thus determined by the required product flow rate. When an equivalent amount of this low molecular weight product is purified using the porous adsorptive membranes of the present invention, however, the required membrane surface area and/or feed pressure can be reduced significantly since only the much smaller volume of higher molecular weight components permeates through the membrane. The separation thus can be accomplished at a potentially lower cost with the membranes of the present invention than with polymeric membranes.

The membrane of the present invention has several other advantages over polymeric membranes for the separation of fluid mixtures. First, much higher permeation rates are possible while retaining satisfactory selectivity between the components to be separated, and this can reduce substantially the membrane surface area needed for the separation. Second, the membranes of the present invention can operate at lower pressure differentials than polymeric membranes in general, which can reduce compression costs and simplify membrane module construction.

The separation characteristics of the composite porous membranes disclosed in U.S. Pat. No. 5,104,425 thus can be improved by the selective application of the methods of the present invention. Proper oxidation steps can improve both the permeability and the selectivity of these earlier membranes for the separation of hydrogen-hydrocarbon mixtures, and the improved membranes are useful for other separations as well.

The essential characteristics of the present invention are described completely in the foregoing disclosure. One skilled in the art can understand the invention and make various modifications thereto without departing from the basic spirit thereof, and without departing from the scope and range of equivalents of the claims which follow.

We claim:

1. A method for making a composite semipermeable membrane for the separation of a multicomponent fluid mixture containing one or more primary components and one or more secondary components comprising the steps of:
   (a) coating a surface of an inert porous substrate with a layer of an organic precursor material;
   (b) heating the resulting coated porous substrate in an inert atmosphere to a first temperature and holding the coated porous substrate at this first temperature for a time sufficient to convert said organic precursor material into a layer of microporous carbonaceous adsorptive material to form a composite membrane;
   (c) cooling the resulting composite membrane to a temperature below said first temperature;
   (d) heating the composite membrane to a second temperature;
   (e) oxidizing the heated composite membrane at said second temperature in an oxidizing atmosphere selected from the group consisting of air, oxygen, carbon oxides, nitrogen oxides, steam, and mixtures thereof; and
   (f) cooling the resulting oxidized composite membrane to a temperature below said second temperature to form the composite semipermeable membrane;
   wherein said microporous carbonaceous adsorptive material can selectively adsorb portions of the primary components which diffuse through the membrane by selective surface flow.

2. The method of claim 1 further comprising repeating steps (a) through (c) at least once.

3. The method of claim 1 which further comprises repeating steps (d) through (f) one or more cycles, wherein the temperature of step (f) is ambient temperature in the last cycle.

4. The method of claim 3 wherein the duration of step (e) is between about 0.25 and 12 hours.

5. The method of claim 3 wherein steps (d) through (f) are repeated through two to four cycles, and wherein the temperature of step (f) is ambient temperature in the last cycle.

6. The method of claim 3 wherein step (e) is carried out at a temperature of between about 200° C. and 950° C.

7. The method of claim 1 wherein said organic precursor material is selected from the group consisting of polyvinylidene chloride, polyvinyl chloride, polyacrylonitrile, styrene-divinylbenzene copolymers, and mixtures thereof.

8. The method of claim 1 wherein the thickness of said layer of microporous carbonaceous adsorptive material is less than about 20 microns.

9. The method of claim 1 wherein said porous substrate has a distribution of pore diameters between about 0.2 and 50 microns and is selected from the group consisting of ceramics materials, carbonaceous materials, metallic materials, polymeric materials and combinations thereof.

10. The method of claim 1 wherein said coated porous substrate is heated in said inert atmosphere to said first temperature of between about 600° C. and 1200° C. at a heating rate of up to about 1.0° C. per minute to form said layer of microporous carbonaceous adsorptive material.

11. A method for making a densified composite semipermeable membrane for the separation of a multicomponent fluid mixture containing one or more primary components and one or more secondary components comprising the steps of:
   (a) introducing an organic precursor material into the pores of an inert porous substrate;
   (b) heating said porous substrate containing said organic precursor to a first temperature and maintaining this first temperature for a sufficient time to convert the organic precursor material to microporous carbonaceous adsorptive material within said pores to form a composite membrane;
   (c) cooling the resulting composite membrane to a temperature below said first temperature;
   (d) heating the composite membrane to a second temperature;
   (e) oxidizing the heated composite membrane at said second temperature in an oxidizing atmosphere selected from the group consisting of air, oxygen, carbon oxides, nitrogen oxides, steam, and mixtures thereof; and
   (f) cooling the resulting oxidized composite membrane to a temperature below said second temperature to form the densified composite semipermeable membrane,
   wherein said microporous carbonaceous adsorptive material can selectively adsorb portions of the primary components which diffuse through the membrane by selective surface flow.

12. The method of claim 11 wherein said organic precursor material is a solution of a polymer in a suitable solvent, and wherein said heating to a first temperature evaporates said solvent thus depositing the polymer within said pores and carbonizes the polymer to yield said microporous carbonaceous adsorptive material.

13. The method of claim 12 wherein said polymer is selected from the group consisting of polyvinylidene chloride, polyvinyl chloride, polyacrylonitrile, styrene-divinylbenzene copolymers, and mixtures thereof.

14. The method of claim 12 wherein said solvent is selected from the group consisting of toluene, tetrahydrofuran, dimethyl formamide, dimethyl sulfoxide, acetone, and benzene and its derivatives.

15. The method of claim 11 wherein said organic precursor material is a hydrocarbon fluid, and wherein said heating to a first temperature promotes vapor phase thermal cracking of hydrocarbon components in said hydrocarbon fluid, whereby carbon is deposited within said pores of said porous substrate.

16. The method of claim 15 wherein said hydrocarbon fluid comprises one or more hydrocarbons selected from the group consisting of alkanes, alkenes, benzene, benzene derivatives, and mixtures thereof.

17. The method of claim 11 wherein said porous substrate has a distribution of pore diameters between about 0.2 and 50 microns and is selected from the group consisting of ceramic materials, carbonaceous materials, metallic materials, polymeric materials and combinations thereof.

18. The method of claim 11 further comprising repeating steps (a) through (c) at least once.

19. The method of claim 11 which further comprises repeating steps (d) through (f) one or more cycles, wherein the temperature of step (f) is ambient temperature in the last cycle.

20. The method of claim 19 wherein the duration of step (e) is between about 0.25 and 12 hours.

21. The method of claim 19 wherein steps (d) through (f) are repeated through two to four cycles, and wherein the temperature of step (f) is ambient temperature in the last cycle.

22. The method of claim 19 wherein step (e) is carried out at a temperature of between about 200° and 950° C.

* * * * *